United States Patent [19]

Sherman

[11] Patent Number: 5,878,037
[45] Date of Patent: Mar. 2, 1999

[54] CODE DIVISION SWITCHING SCHEME

[75] Inventor: Matthew J. Sherman, North Arlington, N.J.

[73] Assignee: Lucent Technologies Inc., Murray Hill, N.J.

[21] Appl. No.: 769,286

[22] Filed: Dec. 18, 1996

[51] Int. Cl.[6] .................................................. H04B 7/216
[52] U.S. Cl. ........................................ 370/335; 375/200
[58] Field of Search .................................... 375/200, 208, 375/206, 365; 370/320, 329, 335, 342, 345, 441, 206, 208, 209, 210

[56] References Cited

U.S. PATENT DOCUMENTS

| | | | |
|---|---|---|---|
| 5,469,468 | 11/1995 | Schilling | 375/200 |
| 5,604,732 | 2/1997 | Kim et al. | 370/342 |
| 5,638,376 | 6/1997 | Miki et al. | 370/342 |
| 5,640,385 | 6/1997 | Long et al. | 370/335 |
| 5,640,416 | 6/1997 | Chalmers | 375/206 |
| 5,703,874 | 12/1997 | Schilling | 370/335 |
| 5,712,868 | 1/1998 | Stern et al. | 375/200 |
| 5,737,327 | 4/1998 | Ling et al. | 370/335 |

*Primary Examiner*—Ajit Patel
*Assistant Examiner*—Chiho Andrew Lee

[57] ABSTRACT

Each user signal of a communications network is encoded using a narrowband traffic code and a wideband cover code for transmission to a signal relay (e.g., a communications satellite) in one of a plurality of uplink signal beams. The signal relay receives all of the user signals in the different uplink signal beams and processes them to re-transmit them in different downlink signal beams to their different appropriate destinations. The narrowband traffic codes and wideband cover codes are selected to encode the individual user signals in such a way as to permit the switching processing of the signal relay to be implemented at the beam level (e.g., individual components processing multiple user signals at a time) rather than at the user level (e.g., one switching circuit for each user). For example, in one embodiment, all user signals within the same signal beam are encoded using different narrowband codes and the same wideband cover code, while user signals in different signal beams are encoded using different wideband cover codes. The present invention enables a reduction in the volume and cost of switching equipment within the signal relay. Furthermore, much of the switching processing can be implemented at intermediate frequencies (IF) using conventional, relatively inexpensive radio frequency (RF) components.

33 Claims, 5 Drawing Sheets

CODE DIVISION SWITCHING SCHEME

BACKGROUND OF THE INVENTION

1. Field of the Invention

The present invention relates to communications, and, in particular, to satellite communication systems.

2. Description of the Related Art

In typical satellite-based communications, the on-board switching equipment consists primarily of a bent-pipe system which acts to receive and then re-transmit a user signal to an appropriate destination. In order to receive multiple user signals from different sources and then re-transmit those different user signals to different appropriate destinations, relatively complex on-board switching designs are required. Conventional solutions to this problem call for individual digital hardware elements to process each user signal. Such solutions greatly increase the amount of equipment, installation and maintenance costs, and user service rates, and decreases signal-to-interference ratios.

There is a need for a seamless, flexible satellite communication network that can provide desired user services with high performance while still keeping satellite switching equipment costs to an acceptable level. An aspect of the present invention addresses this need.

Further aspects and advantages of this invention will become apparent from the detailed description which follows.

SUMMARY OF THE INVENTION

The present invention is directed to methods and apparatuses for processing communications signals. In one method embodiment, a data stream is modulated with a traffic code to generate a narrowband signal. The narrowband signal is spread with a cover code to generate a wideband signal. The wideband signal is transmitted in an uplink signal beam to a signal relay adapted to receive one or more uplink signal beams, wherein each uplink signal beam comprises one or more wideband signals, data streams of each uplink signal beam are modulated with two or more different traffic codes and spread with one or more cover codes, and narrowband signals having the same traffic code in overlapping uplink signal beams are spread with different cover codes.

In one apparatus embodiment, a modulator is adapted to modulate a data stream with a traffic code to generate a narrowband signal, a spreader is adapted to spread the narrowband signal with a cover code to generate a wideband signal, and an antenna is adapted to transmit the wideband signal to a relay node adapted to receive one or more wideband signals in one or more uplink signal beams from one or more such apparatuses, wherein data streams of each uplink signal beam are modulated with two or more different traffic codes and spread with one or more cover codes and narrowband signals having the same traffic code in overlapping uplink signal beams are spread with different cover codes.

In an alternative method embodiment, one or more uplink signal beams are received, wherein each uplink signal beam comprises one or more wideband signals, each wideband signal has been generated by: (1) modulating a data stream with a traffic code to generate a narrowband signal and (2) spreading the narrowband signal with a cover code to generate the wideband signal data streams of each uplink signal beam are modulated with two or more different traffic codes and spread with one or more cover codes, and narrowband signals having the same traffic code in overlapping uplink signal beams are spread with different cover codes. Each uplink signal beam is despread with a corresponding cover code to generate one or more narrowband signals. The one or more narrowband signals for each uplink signal beam are selectively bandpass filtered to isolate narrowband signals for one or more downlink signal beams. The narrowband signals for each downlink signal beam are summed, each summed signal is spread with a corresponding cover code to generate a wideband signal for one of the downlink signal beams, and the wideband signal for each downlink signal beam is transmitted.

In an alternative apparatus embodiment, one or more uplink processors are each adapted to receive one or more wideband signals in an uplink signal beam and convert the wideband signals into narrowband signals isolated for one or more downlink signal beams. One or more downlink processors are each adapted to receive one or more narrowband signals from the uplink processors and generate a wideband signal for transmission in a downlink signal beam, wherein each uplink signal beam comprises one or more wideband signals, each wideband signal in each uplink signal beam has been generated by: (1) modulating a data stream with a traffic code to generate a narrowband signal and (2) spreading the narrowband signal with a cover code to generate the wideband signal, data streams of each uplink signal beam are modulated with two or more different traffic codes and spread with one or more cover codes, and narrowband signals having the same traffic code in overlapping uplink signal beams are spread with different cover codes.

In yet another alternative method embodiment, a wideband signal is received from a signal relay, wherein the wideband signal corresponds to one of a plurality of downlink signal beams transmitted by the signal relay, each downlink signal beam has a wideband signal, each wideband signal was generated by spreading one or more narrowband signals with one or more cover codes, the narrowband signals for each downlink signal beam were generated by mixing data streams with two or more different traffic codes, and narrowband signals having the same traffic code in overlapping downlink signal beams were spread with different cover codes. The received wideband signal is despread with a corresponding cover code to recover the narrowband signals for the received wideband signal. The narrowband signals are processed to retrieve a corresponding data stream.

In yet another alternative apparatus embodiment, a receiver is adapted to receive a wideband signal from a signal relay, wherein the wideband signal corresponds to one of a plurality of downlink signal beams transmitted by the signal relay, each downlink signal beam has a wideband signal, each wideband signal was generated by spreading one or more narrowband signals with one or more cover codes, the narrowband signals for each downlink signal beam were generated by mixing data streams with two or more different traffic codes, and narrowband signals having the same traffic code in overlapping downlink signal beams were spread with different cover codes. A despreader is adapted to despread the received wideband signal with a corresponding cover code to recover the narrowband signals for the received wideband signal. A processor is adapted to process the narrowband signals to retrieve a corresponding data stream.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention provides, for example, an efficient, low-cost satellite communication system which implements code division switching at an intermediate frequency (IF) range using both narrowband user traffic codes based on basis functions and wideband cover (i.e., spreading) codes to improve beam processing. A user signal, encoded with such a narrowband user basis function and such a wideband spreading code, is received by a satellite uplink (i.e., inbound) receiver from a user's spread spectrum signal transmitter. Within the satellite, the wideband codes are decoded and conventional radio frequency (RF) components are used to route particular blocks of user signals to particular downlink (i.e., outbound) signal beams, as dictated by the programming of the RF components. The blocks of user signals are transmitted on particular downlink signal beams to appropriate destination users.

In one embodiment, the present invention takes full advantage of code division multiple access (CDMA) spread spectrum technology to help facilitate high-speed and high-performance satellite communications between a ground-based source user and a ground-based destination user. The present invention may be implemented as an on-board IF switching scheme based on narrowband and wideband basis-function encoding at the periphery of the network (e.g., at the ground-based users) rather than at the hub (e.g., at the satellite).

As described below, according to embodiments of the present invention, on-board switching is performed on an individual beam basis (i.e., blocks of user signals corresponding to multiple users), rather than on the individual user signal basis of conventional switching methods. As a result, on-board equipment volume and costs can be greatly reduced. Additionally, the present invention can be implemented using standard RF components (e.g., filters, mixers, upconverters, and downconverters) operating at IF to switch blocks of received user signals to appropriate downlink signal beams dependent on the particular narrowband traffic codes assigned to the different users.

Figure 1:
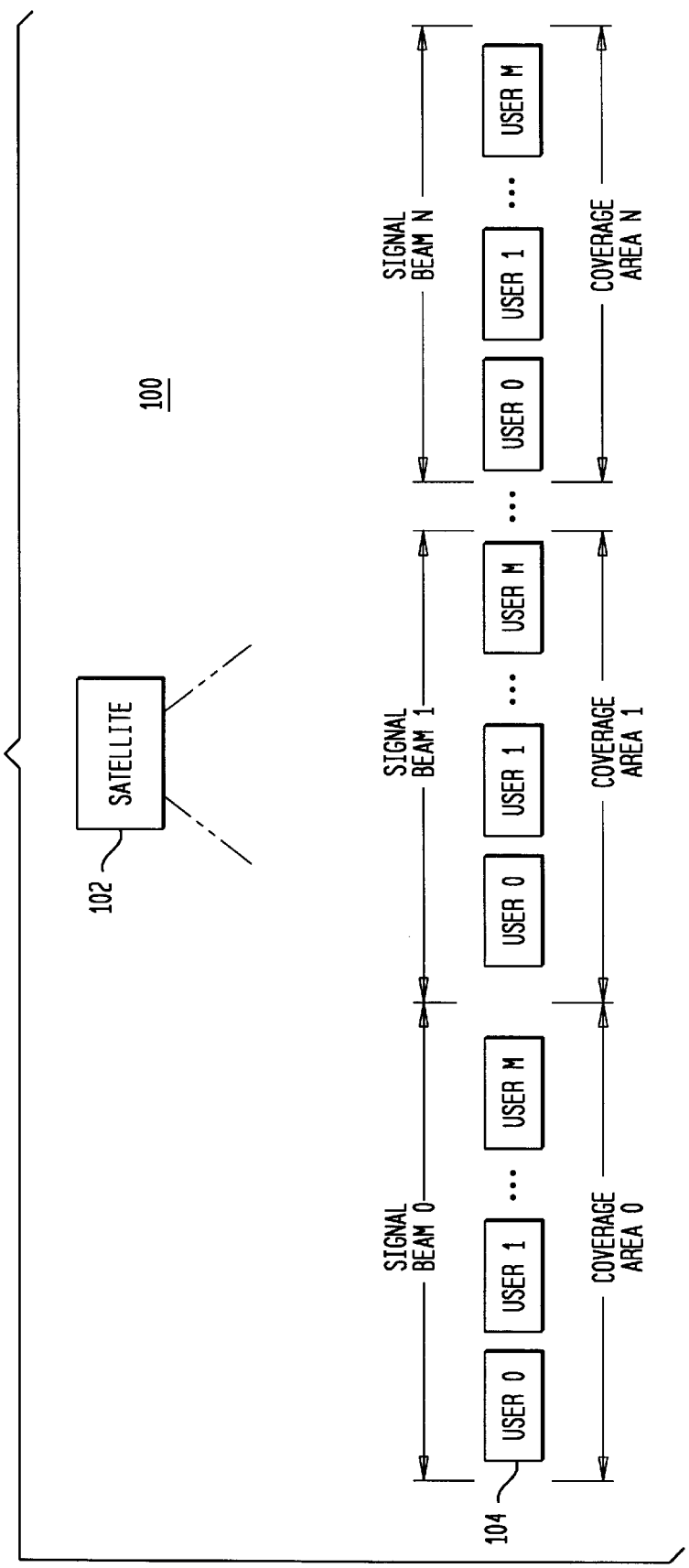
FIG. 1 is a block diagram representative of a communications system, according to one embodiment of the present invention.

Referring now to FIG. 1, there is shown a block diagram representative of communications system 100, according to one embodiment of the present invention. Communications system 100 comprises communications satellite 102 (e.g., in geosynchronous orbit) and a multitude of users 104. For purposes of this specification, the term "user" refers to the equipment that generates signals for transmission to satellite 102 and processes signals received from satellite 102, as opposed to referring to the persons who use that equipment. Depending on the implementation, communications system 100 can be designed to support different types of communications. In one implementation, communications system 100 supports a full range of multimedia communications between users 104. In another implementation, communications system 100 may support telephone communications between users 104.

Satellite 102 has an antenna system designed to receive user signals within different uplink signal beams and then re-transmit the received user signals within different downlink signal beams. Each uplink signal beam and a corresponding downlink signal beam corresponds to a different coverage area of tile satellite antenna system. To ensure total coverage everywhere within the satellite's "field of view," adjacent coverage areas will typically overlap to some degree with one another. Those skilled in the art will understand that, although the different coverage areas are represented in FIG. 1 in one dimension, in operation, the coverage areas are actually two-dimensional or, even more accurately, three-dimensional regions.

As shown in FIG. 1, signals transmitted by the users located in coverage area 0 are received by satellite 102 as part of uplink signal beam 0. Similarly, signals from the users located in coverage areas 1 to N are received by satellite 102 as part of uplink signal beams 1 to N, respectively. Analogously, satellite 102 transmits signals to users located in coverage areas 0 to N in downlink signal beams 0 to N, respectively.

In one implementation, communications system 100 may be used to support multimedia communications between different pairs of users within the satellite's field of view. For example, user 1 in coverage area 0 may communicate with user 0 in coverage area 1. At the same time, user 0 in coverage area 0 may communicate with user M in coverage area N. Simultaneously, user 1 in coverage area 1 may communicate with user M in coverage area 1. In order to support these different communications, satellite 102 is able to receive all of the user signals in all of the uplink signal beams and then re-transmit those user signals to the appropriate destinations within the appropriate downlink signal beams.

Figure 2:
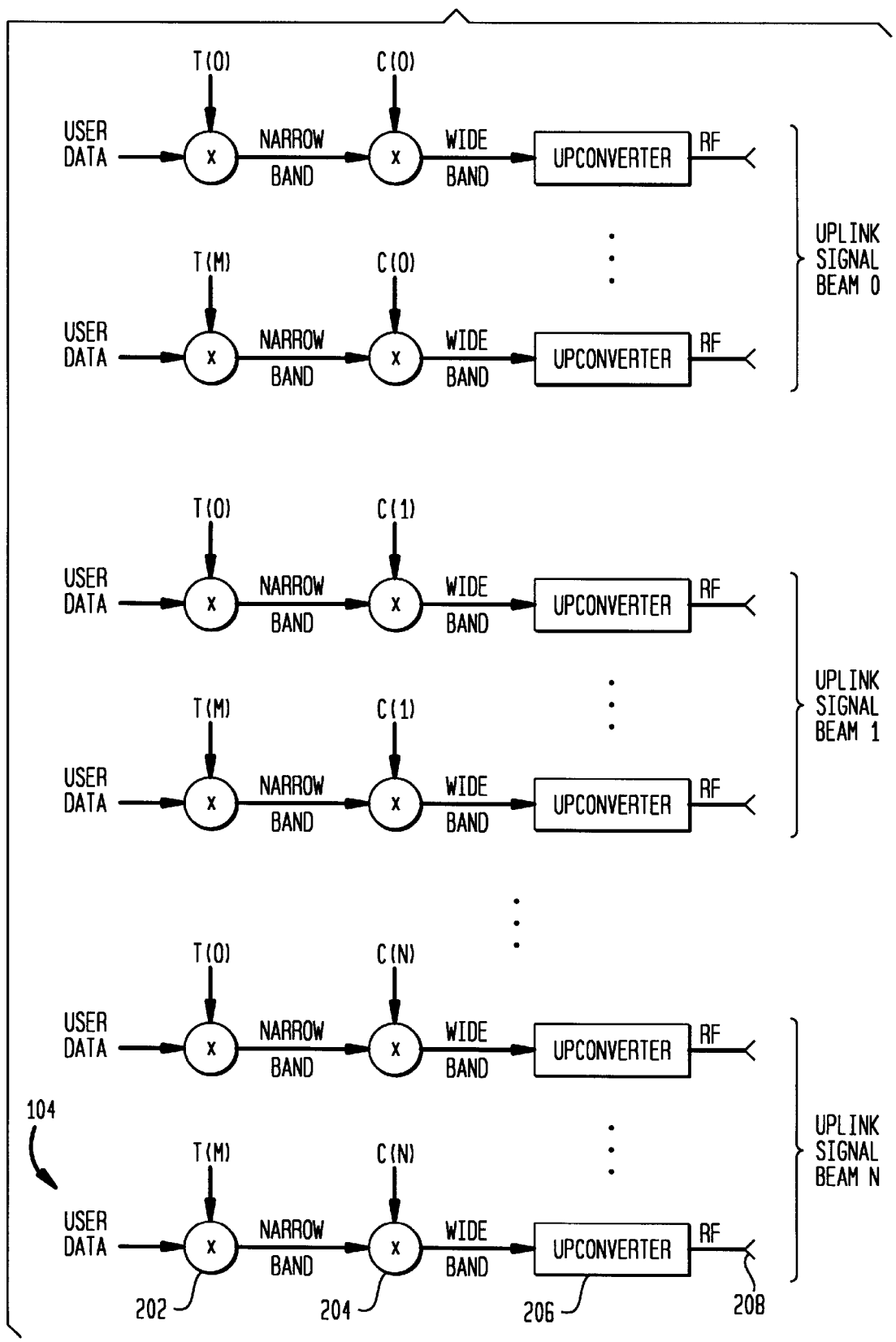
FIG. 2 is a block diagram of the uplink processing implemented by all of the users in the communications system of FIG. 1.

Referring now to FIG. 2, there is shown a block diagram of the uplink processing implemented by all of the users 104 in communications system 100 of FIG. 1, according to one embodiment of the present invention. As shown in FIG. 2, each user 104 has mixers 202 and 204, upconverter 206, and antenna 208.

Mixer 202 acts as a modulator by mixing the user data with a narrowband traffic code T(i) to generate a narrowband signal. A wide variety of narrowband coding techniques can be used for this step, including direct digital synthesis (DDS) techniques. In one embodiment, the narrowband codes T(i) are narrow frequency traffic codes that correspond to different narrowband fast Fourier transform (FFT) bins. In alternative embodiments, other narrowband encoding techniques may be used. These alternative techniques include, but are not limited to, wavelet transform-based approaches, sub-band approaches, and analog approaches.

Mixer 204 acts as a spreader by mixing the narrowband signal generated by mixer 202 with a wideband spreading "cover" code C(j) to generate a wideband signal. A wide variety of wideband spreading codes can be used for this step, including conventional Gold codes. In one embodiment, the cover codes C(j) are wideband direct sequence spreading codes (e.g., CDMA codes).

Mixers 202 and 204 both operate at an IF range. Upconverter 206 upconverts the wideband signal from IF to an appropriate RF range for transmission by antenna 208 to satellite 102 of FIG. 1 within one of the uplink signal beams.

As shown in FIG. 2, each uplink signal beam may have one or more user signals, where each user signal within a particular uplink signal beam is encoded with a different narrowband traffic code T(i) and the same cover code C(j). Different cover codes C(j) are used to encode the user signals of different uplink signal beams, although the same traffic codes T(i) can be re-used to encode user signals in different uplink signal beams. The use of different traffic codes T(i) to encode user data within each uplink signal beam uniquely identifies each user signal within that uplink signal beam with a particular user. The use of different cover codes C(j) for different uplink signal beams uniquely identifies each user signal with a particular uplink signal beam. This coding scheme ensures that each user signal is distinguishable from and will not interfere with any other user signal in communications system 100.

Those skilled in the art will understand that, in alternative embodiments of the present invention, the constraints listed in the previous paragraph may be relaxed somewhat. Since only adjacent signal beams (e.g., those with coverage areas that abut (or even overlap) one another) will typically have a non-negligible tendency to interfere, it will be understood that the same cover code can be used in two or more signal beams that are not adjacent to one another. It will also be understood that multiple cover codes can be used within a given signal beam to provide even greater flexibility and capacity. It will understood that, if different cover codes are used to encode two or more user signals within the same signal beam, the same narrowband traffic code may be used for those user signals. Any interference between such narrowband signals may be able to be kept to an acceptably low level.

In the embodiment described in connection with FIG. 2, narrowband basis functions and wideband cover codes are used to encode each user signal. Those skilled in the art will understand that alternative embodiments of the present invention may rely on other encoding schemes. For example, wideband basis functions could be used instead of the narrowband basis functions. If wideband basis functions are used, the filters used to select desired sets of basis functions would no longer act as conventional filters. In theory, the basis functions should combine linearly and it should be possible to design filters that reject sets of codes and pass other sets.

Figure 3:
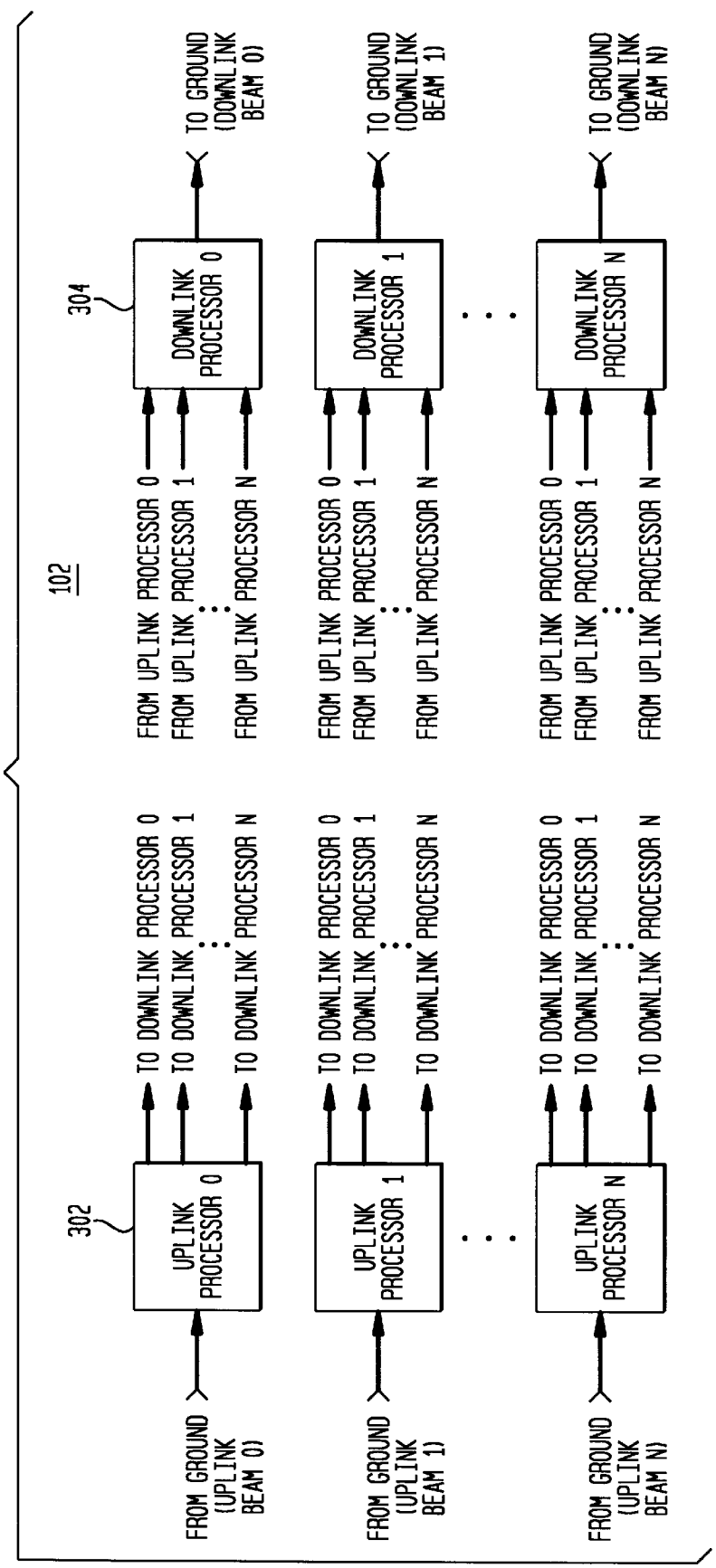
FIG. 3 is a block diagram of the switching processing implemented by the satellite of FIG. 1.

Referring now to FIG. 3, there is shown a block diagram of the switching processing implemented by satellite 102 of FIG. 1, according to one embodiment of the present invention. Satellite 102 comprises an uplink processor 302 for each uplink signal beam and a downlink processor 304 for each downlink signal beam. Each uplink processor 302 receives all of the user signals in the corresponding uplink signal beam and processes those signals to direct them to the appropriate downlink processors 304 for inclusion in the appropriate downlink signal beams. This uplink processing, involves downconverting the received RF signals to IF, removing the cover code for each uplink signal beam to reveal the underlying narrowband user signals, and filtering the narrowband user signals to isolate and route particular user signals to particular downlink processors.

Each downlink processor 304 receives the narrowband user signals from the various uplink processors 302 and processes those user signals for transmission in the corresponding downlink signal beam. This downlink processing involves summing all of the user signals for the particular downlink signal beam, reapplying an appropriate cover code to the summed (i.e., combined) signals to generate a wideband signal uniquely associated with the particular downlink signal beam, and upconverting the wideband signal from IF to RF for transmission. As such, satellite 102 acts as a signal relay that performs the switching function that directs each received user signal to the appropriate destination.

Figure 4:
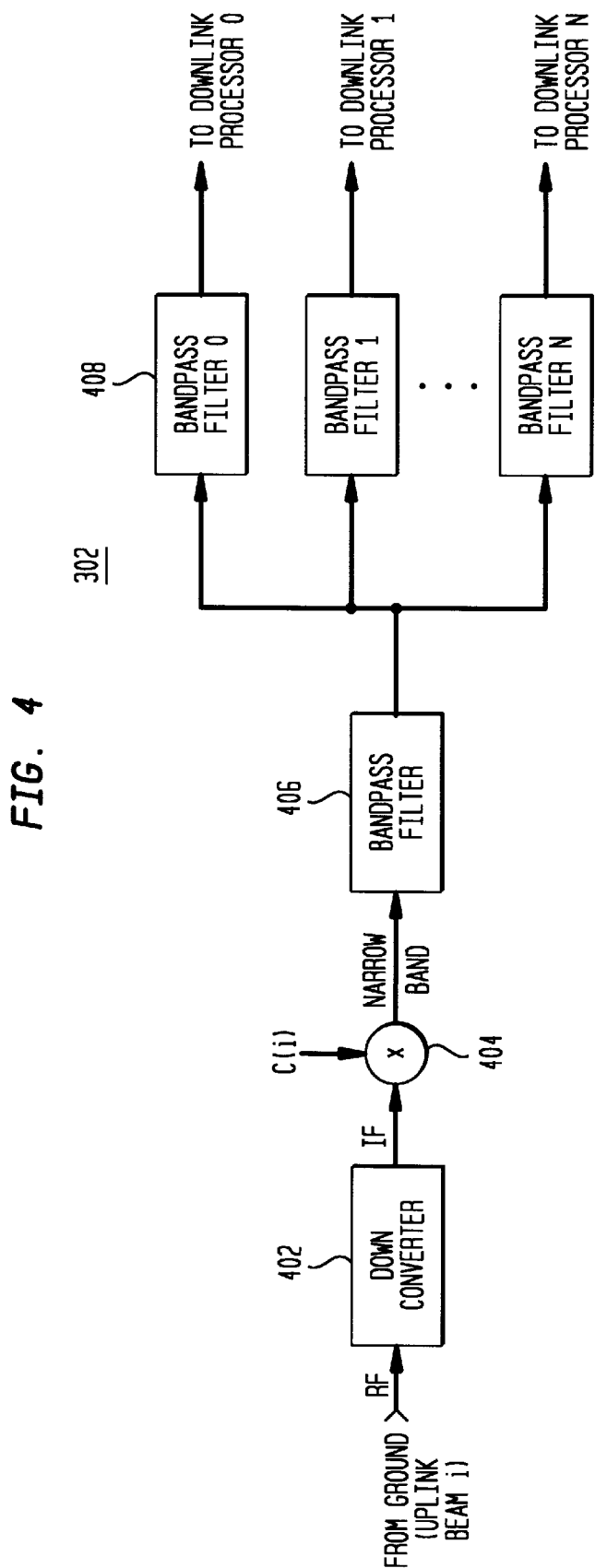
FIG. 4 is a block diagram of the processing implemented by each uplink processor of the satellite of FIG. 3.

Referring now to FIG. 4, there is shown a block diagram of the processing implemented by each uplink processor 302 of satellite 102 of FIG. 3, according to one embodiment of the present invention. Uplink processor 302 comprises downconverter 402, mixer 404, bandpass filter 406, and a bank of programmable bandpass filters 408, with one programmable bandpass filter 408 for each downlink signal beam.

Downconverter 402 downconverts the wideband user signals received by satellite 102 in uplink signal beam i from RF to IF, where i corresponds to one of the N+1 uplink signal beams. Mixer 404 acts as a despreader by mixing in bulk all of the downconverted wideband signals synchronously with the appropriate cover code C(i) to recover the narrowband user signals. Mixer 404 decorrelates any narrowband interference as well as interference from adjacent uplink signal beams. Bandpass filter 406 filters out unwanted signals (e.g., low-level white background noise from adjacent beam traffic and decorrelated narrowband interference) lying outside the desired IF range.

Each bandpass filter 408 receives all of the narrowband user signals and passes one or more (or none, if appropriate) of the narrowband user signals to a corresponding downlink processor (304 in FIG. 3). Each bandpass filter 408 may be adaptively programmed to isolate and select only those narrowband user signals that are intended to be transmitted within the corresponding downlink signal beam. For example, bandpass filter 0 may be programmed to pass on to downlink processor 0 only those narrowband signals generated using traffic codes T(0) to T(k). Similarly, bandpass filter 1 may be programmed to pass on to downlink processor 1 only those narrowband signals generated using traffic codes T(k+1) to T(m) and bandpass filter N may be programmed to pass on to downlink processor N only those narrowband signals generated using traffic codes T(N−p) to T(N), where 0<k<m<N−p<N. In this implementation, each downlink processor is programmed to pass narrowband signals generated with a contiguous set of traffic codes. It will be understood that each bandpass filter 408 can also be programmed to pass narrowband signals generated using a non-contiguous set of traffic codes.

Figure 5:
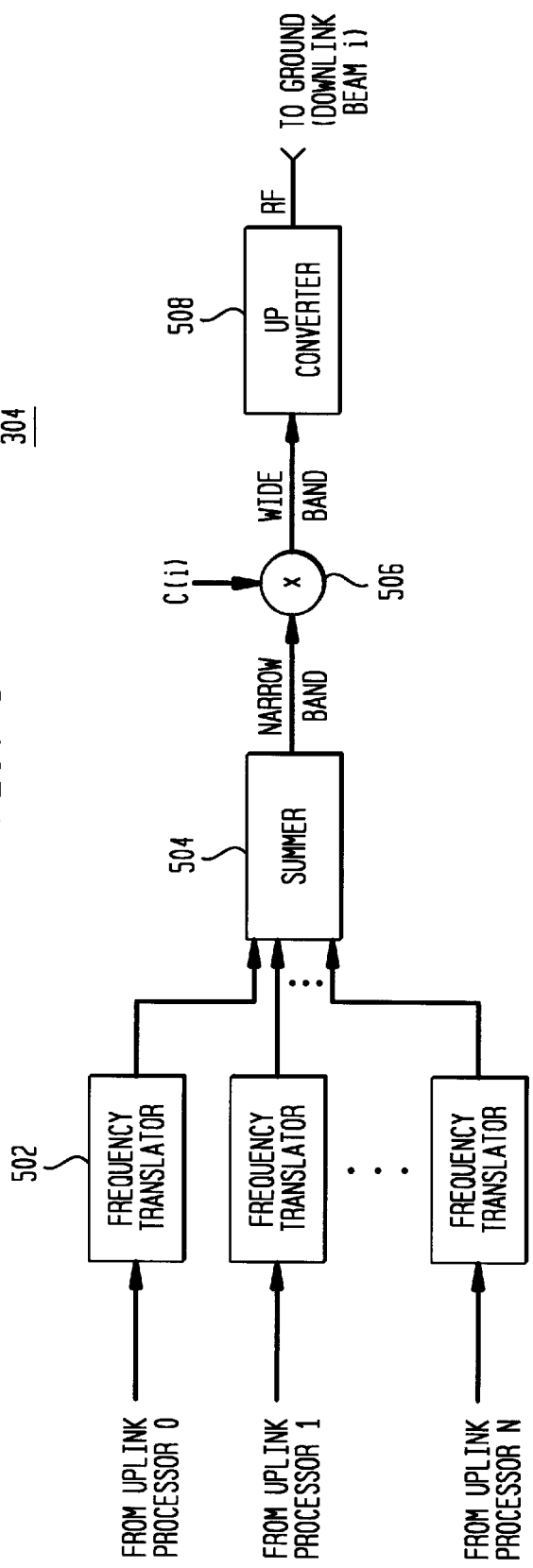
FIG. 5 is a block diagram of the processing implemented by each downlink processor of the satellite of FIG. 3.

Referring now to FIG. 5, there is shown a block diagram of the processing implemented by each downlink processor 304 of satellite 102 of FIG. 3, according to one embodiment of the present invention. Downlink processor 304 comprises a bank of frequency translators 502, with one frequency translator 502 for each uplink processor 302, summer 504, mixer 506, and upconverter 508. Each frequency translator 502 receives one or more (or none, if appropriate) of the narrowband user signals from the corresponding uplink processor 302 of FIG. 3 and translates the frequencies of those narrowband signals as appropriate. Summer 504 sums all of the narrowband signals together. Mixer 506 acts as a spreader by mixing the summed narrowband signals with the appropriate cover code C(i) to generate a single wideband signal corresponding to all of the user signals. Upconverter 508 upconverts the wideband signal from IF to RF for transmission by satellite 102 within the corresponding downlink signal band.

Those skilled in the art will understand that, depending where the intelligence exists in the switching processing, frequency translators 502 may be optional. In general, system operations may be controlled by a ground-based network operations control center (NOCC) (not shown in the figures), which would assign codes and reconfigure the filters dynamically (on demand) so that desired routings are established and maintained. An asynchronous orderwire can be used at initiation of service to establish synchronization prior to issuing a narrowband traffic code. The NOCC insures that no two users using the same uplink or downlink signal beam are using the same narrowband traffic code. Moreover, the NOCC may be used to ensure that bandpass filters 408 of FIG. 4 always filter user signals corresponding to contiguous sets of narrowband traffic codes.

In the embodiments of the uplink and downlink processors shown in FIGS. 4 and 5, all of the signal processing from mixer 404 of uplink processor 302 through mixer 506 of downlink processor 304 is performed at IF. As such, relatively inexpensive, conventional RF equipment can be used for the components performing that processing. Moreover, within each uplink and downlink processor, the processing is performed at the beam level rather than at the user level. That is, according to this embodiment of the present invention, blocks of user signals are simultaneously processed by individual components, such as filters. As such, groups of user signals are switched in blocks without having to dedicate an individual switching circuit for each user. Furthermore, by encoding each user signal with different narrowband traffic codes, user signals can be switched without having to demodulate each signal. All of this greatly reduces the amount and cost of equipment needed in the on-board switching system.

In one embodiment of the present invention, the cover codes C(i) are CDMA codes. CDMA coding provides certain advantages over frequency division multiple access (FDMA) coding. Some of these advantages relate to suppression of interference from and to other systems as well as efficient use and re-use of frequencies. Those skilled in the art will understand that the present invention relates to an encoding scheme that provides the advantages of CDMA coding while permitting efficient beam-level FDMA-like switching. In that sense, the present invention provides advantages of both CDMA and FDMA coding.

Those skilled in the art will understand that, in embodiments of the present invention in which different cover codes are used to encode different user signals within the same uplink signal beam, multiple cover code decoders (e.g., 404 in FIG. 4) may be needed to process each signal beam at the satellite and a different set of filters (e.g., 408 in FIG. 4) may need to be used for each different set of user signals of that particular signal beam.

Figure 6:
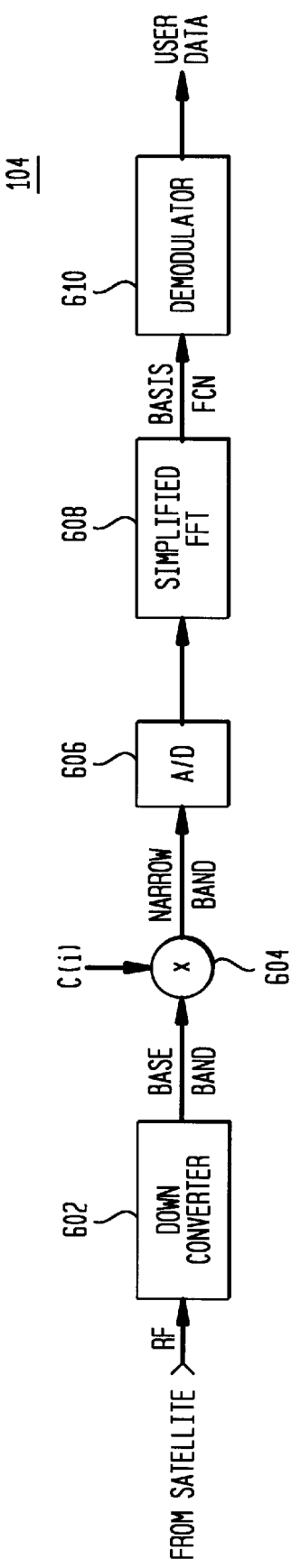
FIG. 6 is a block diagram of the downlink processing implemented by each user of the communications system of FIG. 1.

Referring now to FIG. 6, there is shown a block diagram of the downlink processing implemented by each user 104 of communications system 100 of FIG. 1, according to one embodiment of the present invention. Each user 104 comprises downconverter 602, mixer 604, analog-to-digital (A/D) converter 606, transform 608, and demodulator 610. Each user 104 operates as a spread spectrum receiver that receives, downconverts, and decodes a particular user signal based on the encoded wideband cover code and narrowband traffic code to distinguish between individual downlink signal beams and individual user signals within a downlink signal beam, respectively.

In particular, downconverter 602 downconverts the RF wideband signal received by user 104 from satellite 102 to baseband for subsequent processing. Those skilled in the art will understand that, in alternative embodiments, the wideband RF signal could be downconverted to IF for subsequent processing. Downconverting to baseband permits the use of less complex and less expensive components for the subsequent processing in user 104.

Mixer 604 acts as a despreader by mixing the wideband signal with the appropriate cover code C(i) to recover the narrowband user signals corresponding to the downlink signal beam. A/D converter 606 digitizes the narrowband user signals. Transform 608 applies a simplified FFT to isolate the particular narrowband signal corresponding to the particular user. Demodulator 610 demodulates the narrowband signal to recover the corresponding user data.

Those skilled in the art will understand that the output of mixer 604 can be treated as an FDMA signal. As such, it can be decoded using any suitable FDMA decoding technique. Moreover, the particular decoding technique will depend on the particular narrowband encoding scheme performed by mixer 202 of FIG. 2 during uplink processing. This includes, but is not limited to, transform-based decoding of orthogonal FDMA signals in which all carriers are decoded at once.

In the embodiment shown in FIG. 1, communications system 100 is a satellite-based communications system in which a single satellite 102 handles all of the switching for signals from multiple ground-based users 104. Those skilled in the art will understand that the present invention may be implemented in alternative embodiments. For example, the signal relay may be a ground-based switching node instead of an orbiting satellite. In other implementations, communications systems in accordance with the present invention may have two or more satellites, each of which is capable of receiving and transmitting user signals from and to either ground-based users or another satellite, thereby enabling an increase in the total coverage area of the communications system. In such an embodiment, inter-satellite communication may be treated by the transmitting satellite as just another downlink signal beam and by the receiving satellite as just another uplink signal beam. In general, the present invention can be applied to any wired or wireless network (e.g., star networks) that uses spread spectrum technology.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing communications signals, comprising the steps of:
   (a) modulating a data stream with a traffic code to generate a narrowband signal;
   (b) spreading the narrowband signal with a cover code to generate a wideband signal; and
   (c) transmitting the wideband signal in an uplink signal beam to a signal relay adapted to receive one or more uplink signal beams wherein:
      each uplink signal beam comprises one or more wideband signals;
      data streams of each uplink signal beam are modulated with two or more different traffic codes and spread with one or more cover codes; and
      narrowband signals having the same traffic code in overlapping uplink signal beams are spread with different cover codes.

2. The invention of claim 1, wherein the signal relay is an orbiting communications satellite; each uplink signal beam corresponds to a different coverage area of the satellite; and each data stream corresponds to a different user of the satellite located within one of the coverage areas.

3. The invention of claim 1, wherein each traffic code corresponds to a different narrowband fast Fourier transform (FFT) bin and each cover code corresponds to a different wideband direct sequence spreading code.

4. The invention of claim 1, wherein step (c) comprises the step of upconverting the wideband signal before transmitting.

5. An apparatus for processing communications signals, comprising:
   (a) a modulator adapted to modulate a data stream with a traffic code to generate a narrowband signal;
   (b) a spreader adapted to spread the narrowband signal with a cover code to generate a wideband signal; and
   (c) an antenna adapted to transmit the wideband signal to a relay node adapted to receive one or more wideband signals in one or more uplink signal beams from one or more such apparatuses, wherein:
      data streams of each uplink signal beam are modulated with two or more different traffic codes and spread with one or more cover codes; and
      narrowband signals having the same traffic code in overlapping uplink signal beams are spread with different cover codes.

6. The invention of claim 5, wherein the signal relay is an orbiting communications satellite; each uplink signal beam corresponds to a different coverage area of the satellite; and each data stream corresponds to a different user of the satellite located within one of the coverage areas.

7. The invention of claim 5, wherein each traffic code corresponds to a different narrowband FFT bin and each cover code corresponds to a different wideband direct sequence spreading code.

8. The invention of claim 5, further comprising an upconverter adapted to upconvert the wideband signal before being transmitted by the transmitter.

9. A method for processing communications signals, comprising the steps of:
   (a) receiving one or more uplink signal beams, wherein:
      each uplink signal beam comprises one or more wideband signals;
      each wideband signal has been generated by:
         (1) modulating a data stream with a traffic code to generate a narrowband signal; and
         (2) spreading the narrowband signal with a cover code to generate the wideband signal;
      data streams of each uplink signal beam are modulated with two or more different traffic codes and spread with one or more cover codes; and
      narrowband signals having the same traffic code in overlapping uplink signal beams are spread with different cover codes;
   (b) despreading each uplink signal beam with a corresponding cover code to generate one or more narrowband signals;
   (c) selectively bandpass filtering the one or more narrowband signals for each uplink signal beam to isolate narrowband signals for one or more downlink signal beams;
   (d) summing the narrowband signals for each downlink signal beam;
   (e) spreading each summed signal with a corresponding cover code to generate a wideband signal for one of the downlink signal beams; and
   (f) transmitting tile wideband signal for each downlink signal beam.

10. The invention of claim 9, wherein the method is implemented by an orbiting communications satellite; each uplink signal beam corresponds to a different coverage area of the satellite; each downlink signal beam corresponding to a different coverage area of the satellite; and each narrowband signal corresponds to a different user of the satellite located within one of the coverage areas.

11. The invention of claim 9, wherein each traffic code corresponds to a different narrowband FFT bin and each cover code corresponds to a different wideband direct sequence spreading code.

12. The invention of claim 9, wherein step (b) comprises the step of downconverting the wideband signals of each uplink signal beam to an intermediate frequency (IF) range before despreading and step (e) comprises the step of upconverting the wideband signal of each downlink signal beam from the IF range after spreading.

13. The invention of claim 9, wherein step (c) comprises the step of simultaneously filtering sets of narrowband signals for each uplink signal beam.

14. An apparatus for processing communications signals, comprising:
   (a) one or more uplink processors, each adapted to receive one or more wideband signals in an uplink signal beam and convert the wideband signals into narrowband signals isolated for one or more downlink signal beams; and
   (b) one or more downlink processors, each adapted to receive one or more narrowband signals from the uplink processors and generate a wideband signal for transmission in a downlink signal beam, wherein:
      each uplink signal beam comprises one or more wideband signals;
      each wideband signal in each uplink signal beam has been generated by:
         (1) modulating a data stream with a traffic code to generate a narrowband signal; and
         (2) spreading the narrowband signal with a cover code to generate the wideband signal;
      data streams of each uplink signal beam are modulated with two or more different traffic codes and spread with one or more cover codes; and
      narrowband signals having the same traffic code in overlapping uplink signal beams are spread with different cover codes.

15. The invention of claim 14, wherein the apparatus is an orbiting communications satellite; each uplink signal beam corresponds to a different coverage area of the satellite; each downlink signal beam corresponding to a different coverage area of the satellite; and each narrowband signal corresponds to a different user of the satellite located within one of the coverage areas.

16. The invention of claim 14, wherein each traffic code corresponds to a different narrowband FFT bin and each cover code corresponds to a different wideband direct sequence spreading code.

17. The invention of claim 14, wherein:
   each uplink processor is adapted to despread one of the uplink signal beams with a corresponding cover code to generate one or more narrowband signals and selectively bandpass filter the narrowband signals to isolate narrowband signals for the downlink signal beams; and
   each downlink processor is adapted to sum the narrowband signals for one of the downlink signal beams; spread the summed signal with a corresponding cover code to generate a wideband signal for the downlink signal beam; and transmit the wideband signal for the downlink signal beam.

18. The invention of claim 17, wherein each uplink processor is adapted to downconvert the wideband signals of one of the uplink signal beams to an IF range before despreading and each downlink processor is adapted to upconvert the wideband signal of one of the downlink signal beams from the IF range after spreading.

19. The invention of claim 14, wherein:

each uplink processor comprises a despreader adapted to despread one of the uplink signal beams with a corresponding cover code to generate one or more narrowband signals and one or more bandpass filters adapted to selectively bandpass filter the narrowband signals to isolate narrowband signals for the downlink signal beams; and each downlink processor comprises a summer adapted to sum the narrowband signals for one of the downlink signal beams; a spreader adapted to spread the summed signal with a corresponding cover code to generate a wideband signal for the downlink signal beam; and a transmitter adapted to transmit the wideband signal for the downlink signal beam.

20. The invention of claim 19, wherein the despreader and bandpass filters of each uplink processor and the summer and spreader of each downlink processor are RF components.

21. The invention of claim 14, wherein each uplink processor simultaneously filters sets of narrowband signals for each uplink signal beam.

22. A method for processing communications signals, comprising the steps of:

(a) receiving a wideband signal from a signal relay, wherein:
    the wideband signal corresponds to one of a plurality of downlink signal beams transmitted by the signal relay;
    each downlink signal beam has a wideband signal;
    each wideband signal was generated by spreading one or more narrowband signals with one or more cover codes;
    the narrowband signals for each downlink signal beam were generated by mixing data streams with two or more different traffic codes; and
    narrowband signals having the same traffic code in overlapping downlink signal beams were spread with different cover codes;

(b) despreading the received wideband signal with a corresponding cover code to recover the narrowband signals for the received wideband signal; and (c) processing the narrowband signals to retrieve a corresponding data stream.

23. The invention of claim 22, wherein the signal relay is an orbiting communications satellite; each downlink signal beam corresponding to a different coverage area of the satellite; and each narrowband signal corresponds to a different user of the satellite located within one of the coverage areas.

24. The invention of claim 22, wherein each traffic code corresponds to a different narrowband FFT bin and each cover code corresponds to a different wideband direct sequence spreading code.

25. The invention of claim 22, wherein step (b) comprises the step of downconverting the wideband signal before despreading.

26. The invention of claim 25, wherein step (b) comprises the step of downconverting the wideband signal to baseband before despreading.

27. The invention of claim 22, wherein step (c) comprises the steps of:

(1) digitizing the narrowband signals;
(2) applying a simplified FFT to the digitized signals to isolate the particular narrowband signal; and
(3) demodulating the particular narrowband signal to retrieve the corresponding data stream.

28. An apparatus for processing communications signals, comprising:

(a) a receiver adapted to receive a wideband signal from a signal relay, wherein:
    the wideband signal corresponds to one of a plurality of downlink signal beams transmitted by the signal relay;
    each downlink signal beam has a wideband signal;
    each wideband signal was generated by spreading one or more narrowband signals with one or more cover codes;
    the narrowband signals for each downlink signal beam were generated by mixing data streams with two or more different traffic codes; and
    narrowband signals having the same traffic code in overlapping downlink signal beams were spread with different cover codes;

(b) a despreader adapted to despread the received wideband signal with a corresponding cover code to recover the narrowband signals for the received wideband signal; and (c) a processor adapted to process the narrowband signals to retrieve a corresponding data stream.

29. The invention of claim 28, wherein the signal relay is an orbiting communications satellite; each downlink signal beam corresponding to a different coverage area of the satellite; and each narrowband signal corresponds to a different user of the satellite located within one of the coverage areas.

30. The invention of claim 28, wherein each traffic code corresponds to a different narrowband FFT bin and each cover code corresponds to a different wideband direct sequence spreading code.

31. The invention of claim 28, further comprising a downconverter adapted to downconvert the wideband signal before despreading.

32. The invention of claim 31, wherein the downconverter downconverts the wideband signal to baseband.

33. The invention of claim 28, wherein the processor comprises:

(1) a digitizer adapted to digitize the narrowband signals;
(2) a simplified FFT adapted to isolate the particular narrowband signal from the digitized signals; and
(3) a demodulator adapted to demodulate the particular narrowband signal to retrieve the corresponding data stream.

* * * * *